United States Patent
Walchle et al.

[15] 3,698,791
[45] Oct. 17, 1972

[54] DRAPE FOR OPERATING MICROSCOPE

[72] Inventors: David L. Walchle; Russell G. Smith; James L. Geraci, all of Cincinnati, Ohio

[73] Assignee: Xomox Corporation, Cincinnati, Ohio

[22] Filed: April 19, 1971

[21] Appl. No.: 135,108

[52] U.S. Cl. .......................350/61, 350/65, 350/67
[51] Int. Cl. ...............................................G02b 27/00
[58] Field of Search........350/61, 64, 65, 67, 70, 140, 350/179

[56] References Cited

UNITED STATES PATENTS 3,528,720  9/1970  Treace..........................350/61
2,906,170  9/1959  Kiehl et al. .................350/140
2,984,153  5/1961  Brennan ................350/140 X
3,133,140  5/1964  Winchell.....................350/65

Primary Examiner—John K. Corbin
Attorney—J. Warren Kinney, Jr.

[57] ABSTRACT

The microscope drape is fabricated from a very thin, transparent, heat-resistant plastic film which is adapted to completely house an operating microscope including its support arms whereby no air can escape from the interior of the drape except through the open end thereof which is located remote from the microscope. The drape includes an optically clear, distortion free, transparent lens and means for disposing said lens in parallel, enclosing relationship with the objective lens of the microscope. The drape also includes cylinder-defining ocular-housing extensions which include means for securing said extensions to the oculars of a microscope for precluding the escape of air from the interior of the drape by way of said extensions.

21 Claims, 29 Drawing Figures

PATENTED OCT 17 1972 3,698,791
SHEET 1 OF 7
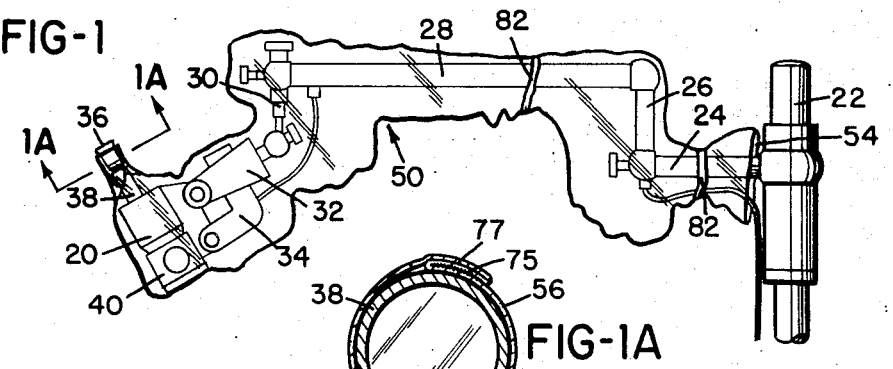
FIG-1
FIG-1A
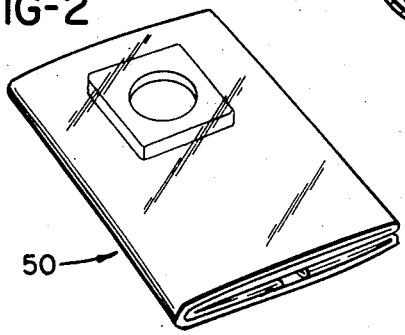
FIG-2
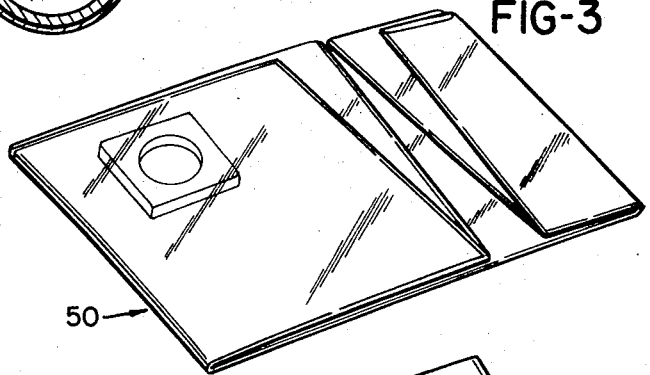
FIG-3
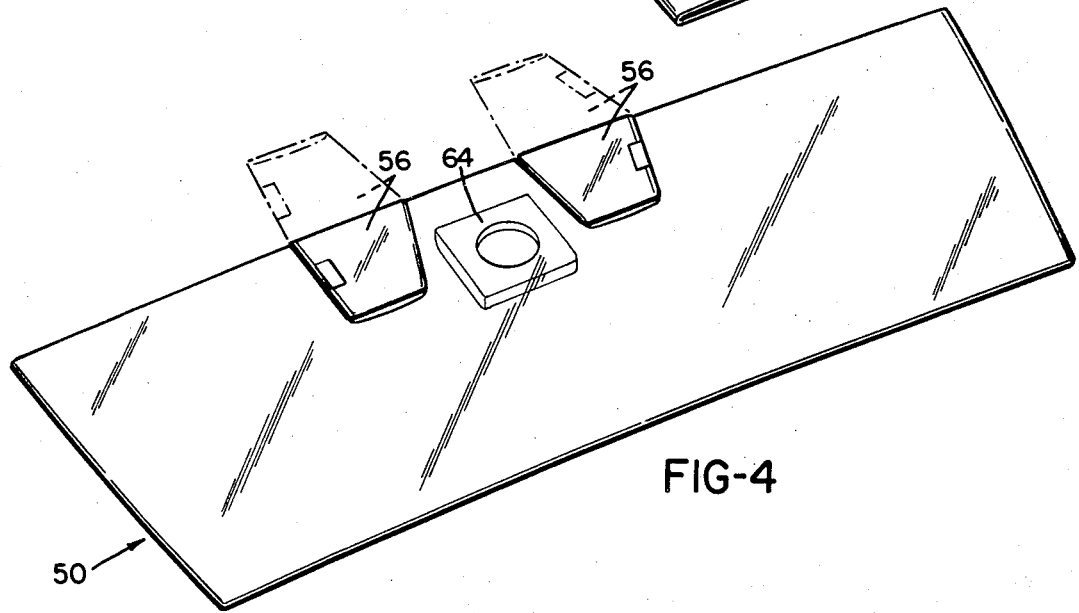
FIG-4
INVENTORS
DAVID L. WALCHLE
RUSSELL G. SMITH
JAMES L. GERACI
BY
J. Warren Kinney Jr.
ATTORNEY

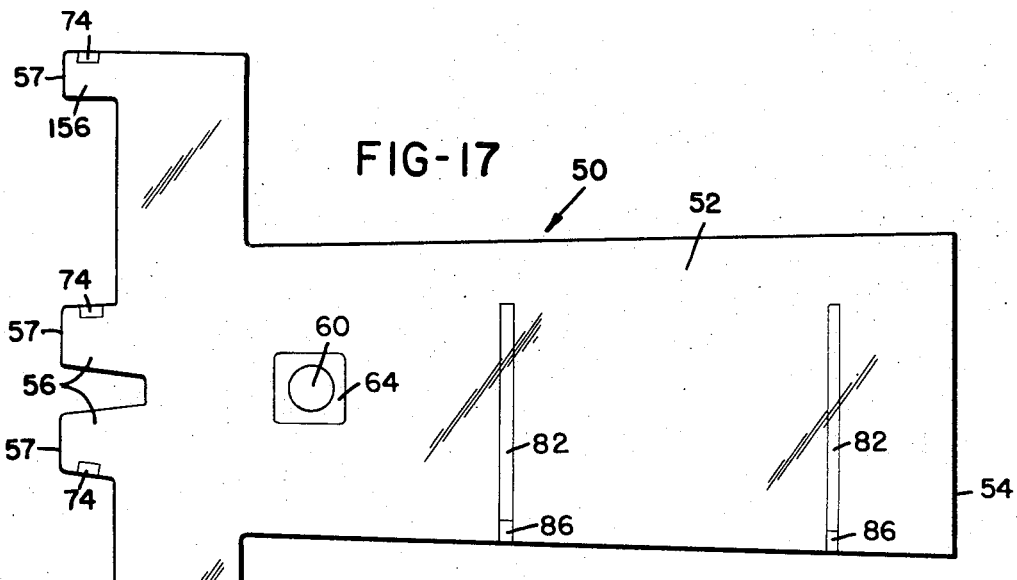
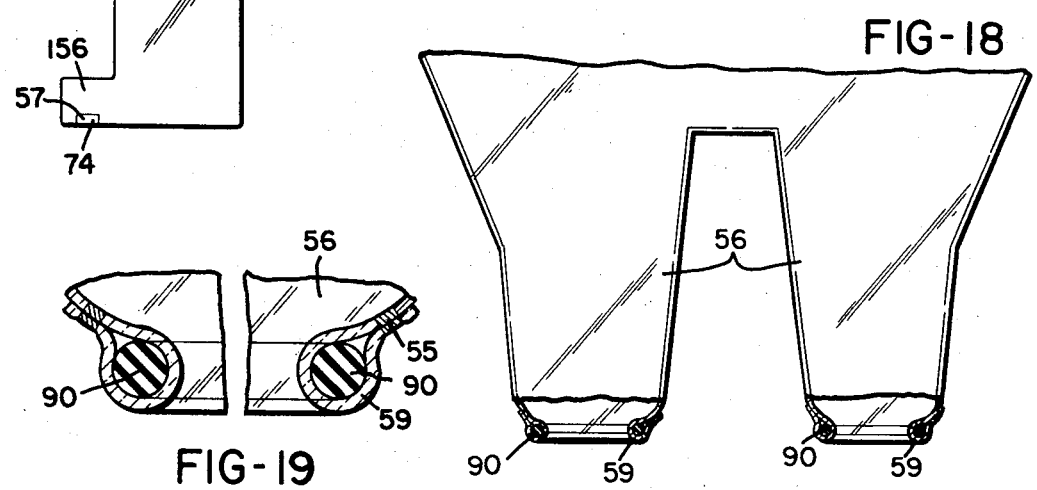
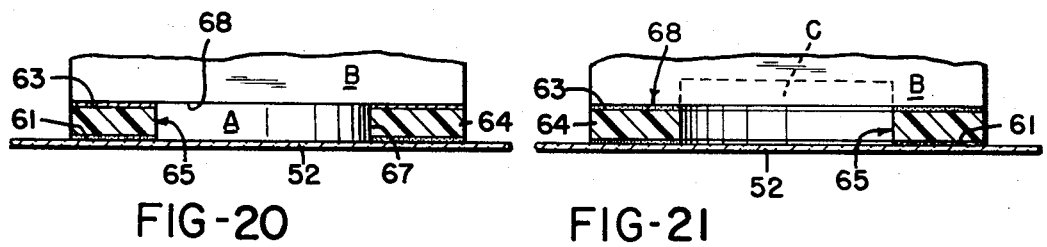

PATENTED OCT 17 1972 3,698,791

DRAPE FOR OPERATING MICROSCOPE

BACKGROUND OF INVENTION

1. Field of the Invention

The field of invention relates to a sterilized, disposable drape for completely enclosing an operative microscope including its support arm.

2. Description of the Prior Art

The closest prior art is embodied in U.S. Pat. No. 3,528,720 wherein the prior art problems solved by that patent are set forth in Col. 1, line 39 through Col. 2, line 36.

Pat. No. 3,528,720 relates to a sack like envelope of flexible material open at one end and initially closed at the other end and having:

a. initially closed-ended tubular sleeve portions adapted to receive the eye-piece projections of a microscope after which the closed ends are removed for uncovering and completely exposing the viewing apertures of the eye-pieces;

b. an open objective lens ring adapted to be secured to a projecting portion of the objective lens of the microscope for exposing the lens, and c. an exhaust port located in substantial alignment with the aforesaid objective lens ring. The said exhaust port constitutes a mass of open cell, foam-plastic disposed above the objective lens illuminating lamp and through which the heated air from the interior of the envelope is exhausted. It is stated in Col. 5, lines 67–73, of this patent, that the aforesaid foam-plastic "also has been found to be useful for rapidly cleaning the working ends portions of hand held surgical instruments. During an operation, a surgeon or attending nurse may quickly wipe a surgical instrument across the upper surface structure of foam plastic disc mass 85 and quickly clean the instrument."

The operating microscope envelope means of Pat. No. 3,528,720 are applied to a cantilever supported operating microscope in an effort to provide a sterile surgical field; however, the heat generated within the envelope is exhausted through the open cell foam plastic of the exhaust port, and since the location of the exhaust port is substantially directly above the operative field there is a distinct hazard of bacteria "fall out" into the entire operating zone including the surgical wound — particularly in those instances in which the surgeon or nurse "cleans" the operating instruments by wiping them across the upper surface of said port. Further, exposure of the operative lens of the microscope through the opening in the operative lens ring of the patent negates the likelihood of a sterile surgical field adjacent the operative lens which, when the microscope is in use by a surgeon, is located in close proximity to the open surgical wound of the patient.

The open operative lens ring of the prior art patent also presents the possibility that the surface of the operative lens may be accidentally or unintentionally touched by a nurse during application of the drape to the microscope thereby rendering the drape unsterile and, therefore, unuseable.

Summary of the Invention

The microscope drape of the present invention is directed to a completely sterile housing within which an unsterile microscope and its support arm is completely housed in such a manner to positively preclude the exhaust of heated air into an operating room at a location adjacent to the operating zone and/or the patient being operated on. The subject drape also includes a shatter-proof, optically clear lens panel as an integral part of the drape and means are provided internally of the drape for securely though releasably mounting said lens relative to the operative lens frame of the microscope for providing a sterile, germ-proof, optically clear barrier between the operative lens of the microscope and the surgical wound of the patient for thereby positively precluding contamination of the wound and/or operating zone by fall-out of dust, germs or other foreign, contaminated particles which are normally present on the unsterile microscope lens. The subject drape likewise includes sterile open-ended tubular members integral with one end of the drape which are adapted to telescopically engage the non-sterile projecting oculars in such a manner that only the outer ends of the eye-piece of said oculars are exposed through the outer open ends of said tubular members, at a location remote from the immediate operating zone. The aforesaid tubular members are securely though releasably fastened to the projecting oculars whereby to positively preclude the exhaust of heated air into the operating room via said tubular members. In a modification of the subject drape a sterile, shatter-proof, optically clear lens member is fixedly secured to and carried by the outer end portion of each tubular member for completely closing the outer end thereof for thereby providing a sterile, germ-proof, optically clear barrier between the eyepieces of the projecting oculars of the microscope and the user of the microscope for thereby positively precluding contamination of the patient and/or the operating zone from dust, germs, or other contaminating particles which are ordinarily present on the occulars and their respective eye-pieces.

The microscope drape of the present invention comprises a flexible, very thin, preferably transparent copolymer capable of withstanding temperatures in excess of 300° F., whereby the drape material is not adversely effected by reason of the substantially high temperatures within the drape which are produced by the objective lens illuminating lamp of the microscope. Heated air from the interior of the subject drape is discharged into the operating room at a location remote from the microscope and the patient, viz, at a location adjacent the connection between said arm with its support means.

In the preferred embodiment of the invention the entire drape assembly is completely sterilized both externally and internally after being folded and packed in an individual envelope, wherein a plurality of such individual envelopes are housed within a carton and wherein a plurality of cartons and their contents are sterilized such as by means of electron beam radiation sterilization, ethylene oxide sterilization, or the like.

DESCRIPTION OF DRAWINGS

FIG. 1 is a side view of a typical arm-supported operating microscope housed within a drape of the present invention.

FIG. 1-A is a sectional view taken on line 1A—1A of FIG. 1.

FIG. 2 is a plan view of a drape in the folded condition in which it is initially removed from a sterile envelope in which the drape is packaged.

FIG. 3, 4 and 5 are plan views showing the drape of FIG. 2 in sequential steps of being unfolded for application to an operative microscope and its support arm.

FIG. 17 is a view similar to FIG. 16 of a drape having cylindrical extensions for housing a microscope having four oculars.

FIG. 18 is a plan view, partly in section, illustrating a modification of the cylindrical extensions which engage the oculars of an operating microscope.

FIG. 19 is an enlarged sectional view of the lower end of one of the cylindrical extensions of FIG. 13.

FIGS. 20, 21 and 22 are modifications of FIGS. 13, 14 and 15.

DESCRIPTION OF THE PREFERRED EMBODIMENTS

Figure 10:
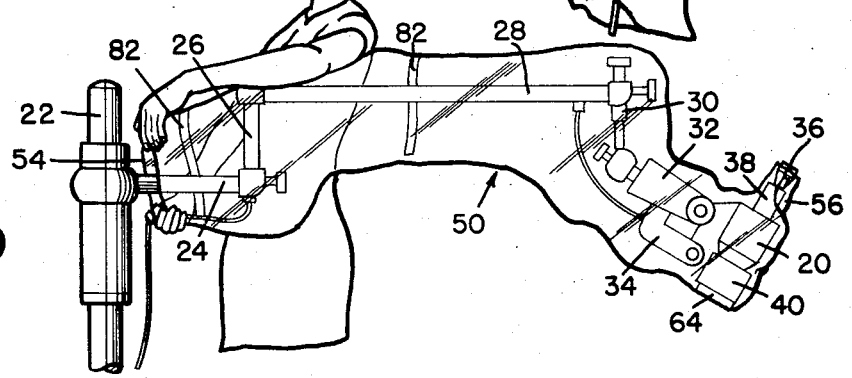
Figure 12:
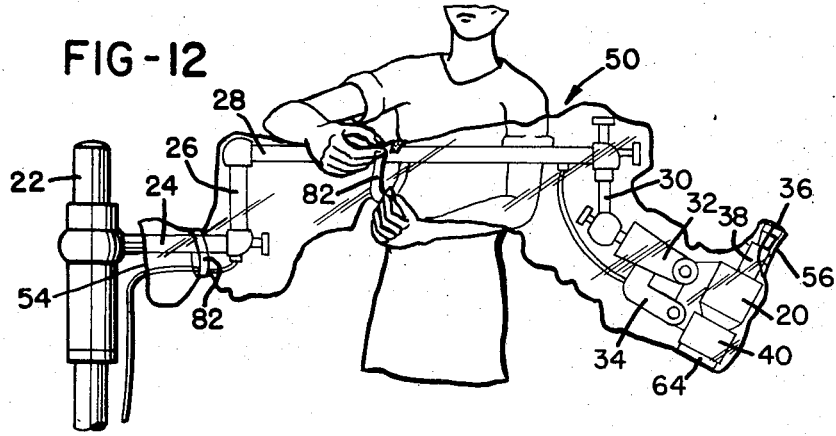

In FIGS. 1, 10 and 12, the numeral 20 denotes generally a conventional operation microscope which is adjustably mounted relative to an upright 22 or other member by means of a support arm which, by way of example, may comprise a series of adjustably interconnected elements 24, 26, 28, 30, 32 and 34 which are articulated in such a manner as to enable the user of the microscope to adjust it in any desired position for enabling an observer looking into eye-piece 36 of oculars 38 to examine and study various portions of a patient to be treated and/or operated on, such as, for example, the eyes, ears, nose, throat, etc. The microscope includes an objective lens 40 and an illuminating lamp, not illustrated, it being understood that the microscope, in its entirety, including its support arm, is a standard piece of medical equipment and constitutes no part of the subject invention.

With further reference to said FIGS., the numeral 50 denotes generally an elongate drape fabricated from a thin, preferably transparent, copolymer sheet material of the type which is capable of withstanding temperatures up to 300° F. without injurious effects.

Figure 16:
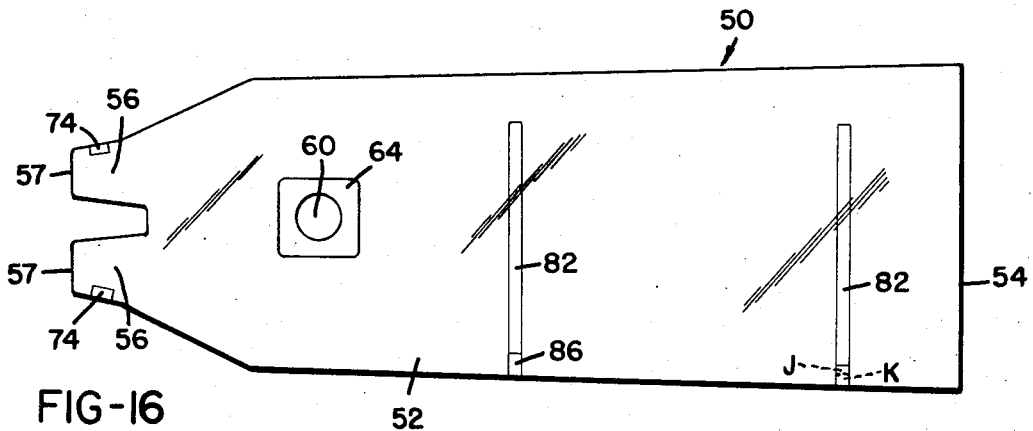
FIG. 16 is a plan view of the drape having cylindrical extensions for housing a microscope having two oculars in a fully extended condition.

As best illustrated in FIG. 16, drape 50 comprises a substantially tubular member having a body portion 52 which is open at one end, 54, and wherein the other end terminates in one or more cylindrical extensions 56 dimensioned to telescopically engage the oculars 38 of a microscope, in a manner hereinafter more fully set forth. The numeral 60 denotes a sheet or lens of transparent material which completely spans and closes the outer surface of an aperture 65 provided through lens housing 64 which is secured to and carried by the inner surface of body portion 52 of the drape at a location adjacent, but spaced from the cylindrical extensions 56.

Figure 13:
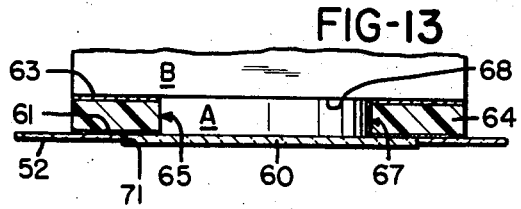
FIG. 13 is a view, partly in vertical section, illustrating the relationship of the drape-lens, or lens housing with the objective lens ring of the type which projects from the lens housing of a microscope.

The lens housing 64 is adapted to be securely though releaseably frictionally mounted to the projecting objective lens ring A of the microscope housing B, as best illustrated in FIGS. 13 and 20 for disposing sheet or lens 60 in covering relationship with respect to the outer end of said lens ring. Uniformly satisfactory results have been obtained in those instances when the lens housing 64 is fabricated from expanded, cross-linked polyethylene foam, the upper and lower surfaces of which are coated with pressure-sensitive adhesive indicated by the numerals 61 and 63. The outer or drape-adjacent surface of the lens housing is coated with a permanent pressure-sensitive adhesive 61 whereas the other or upper surface is coated with a quick release pressure-sensitive adhesive 63 which is normally and initially covered with a removable, protective layer of paper or the like, denoted generally by the numeral 66, see FIG. 15.

The opening 65 of the lens housing of FIGS. 13 and 20 is of a dimension substantially equal to, but preferably slightly less than the diameter of the objective lens ring A, whereby under all normal circumstances the lens ring will be securely anchored to the objective lens ring by means of the frictional relationship between the adjacent surfaces 65 and 67 of the lens housing and lens ring respectively.

However, if desired, the protective layer 66 may be removed from the inner surface of the lens housing for engagement with the lower surface 68 of the microscope housing B adjacent the lens ring A.

Figure 14:
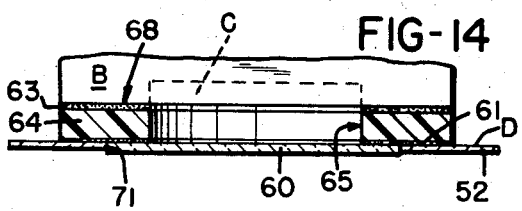
FIG. 14 is a similar view to FIG. 8 illustrating the relationship of the drape-lens or lens housing with the recessed objective lens ring of an operating microscope.

FIGS. 14 and 21 illustrate the manner in which the lens housing 64 may be secured to the lower surface 68 of the microscope housing B of those microscopes of the type in which the lens ring is recessed as at C, in which event the adhesive surface 63 of the lens housing is adhered to surface 68 of the microscope housing, for disposing sheet or lens 60 in covering, spaced relationship with respect to the recessed lens ring C.

Figure 15:
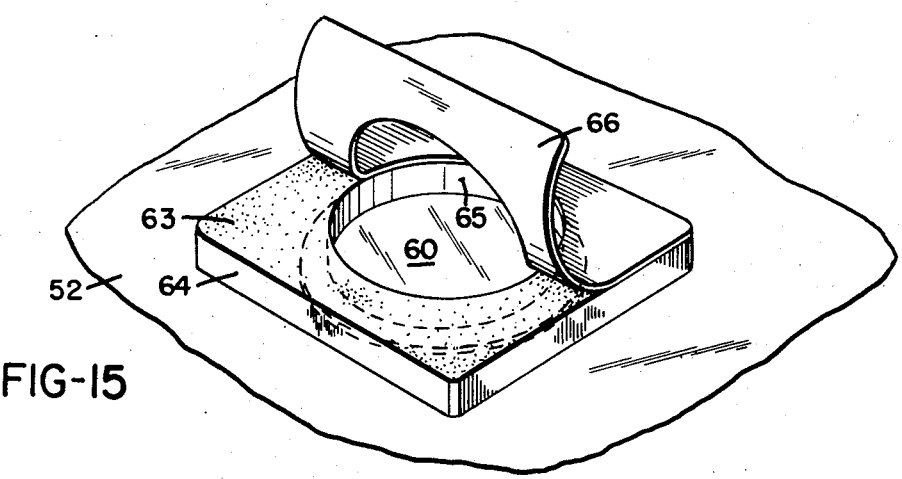
FIG. 15 is a perspective view illustrating the relationship of the drape-lens, drape and drape-lens mounting means of the present invention.

With particular reference now to FIGS. 13, 14, and 15 the numeral 60 denotes a shatter-proof, optically clear lens which is permanently secured relative to the inner surface D of body 52 of the drape by means of the permanent pressure sensitive adhesive 61 which is coated on the drape-adjacent-surface of the lens housing 64.

In the preferred embodiment of the invention the drape material is provided with an aperture 71 into which lens 60 is received, note FIGS. 13 and 14, in such a manner as to provide a fluid and air-tight continuity to the body portion of the drape.

Figure 22:
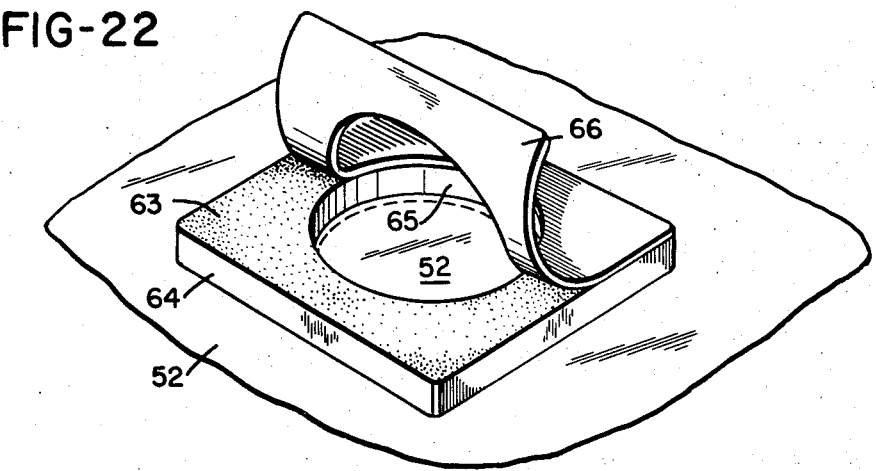

The primary distinction between the disclosure of FIGS. 13, 14, and 15 with FIGS. 20, 21 and 22 resides in the fact that in the latter three figures the drape material 52, per se, completely spans the aperture 65 and the drape-adjacent-surface of the lens housing whereby to provide a continuous, closed surface to body portion 52 of the drape.

Figure 8:
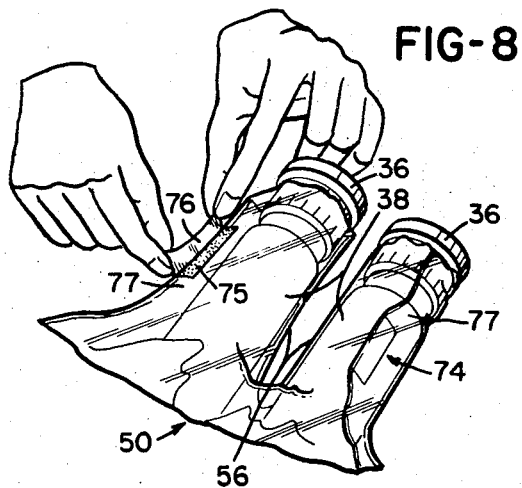

The cylindrical extensions 56 terminate in open, outer ends 57, in order that they may be pulled downwardly over and then securely, though releaseably, fastened to oculars 38 by suitable constricting means such as, by way of example, members 74 which have an inner surface adhered to the outer surface of each extension 56 and an outer surface having a pressure sensitive adhesive 75 (FIG. 8) coated with a protective strip 76 of paper or the like. After each extension 56 has been pulled over an occular, the protective strip 76 is peeled off for exposing adhesive surface 75. The operating room nurse merely provides a tuck 77 in the extension which is disposed over and pressed against the adhesive surface 75 for securing the extension in positive, snug, circumferential engagement with the outer surface of occular 38, as in FIGS. 1A and 8. In this manner the cylindrical extensions engage the oculars 38 with sufficient tightness to preclude the transmittal and/or escape of heated air from the interior of the drape via said tubular members. It should likewise be noted that the securing of the drape extensions to the oculars avoids the use of elastic bands and the like which presented problems of being easily misplaced, dropped or breaking.

The length of the drape is such that its open end 54 will terminate at that end of the microscope support-arm assembly at a location closely adjacent standard 22.

In the preferred embodiment of the invention two thin, flexible, narrow, elongate tie strips 82 of material similar to that from which the drape is made are secured to and carried externally of the drape body (FIGS. 16, 17), one spaced inwardly from, but adjacent outer end 54 of the drape, the other about midway of the drape, between the lens housing 64 and the other strip.

Figure 11:
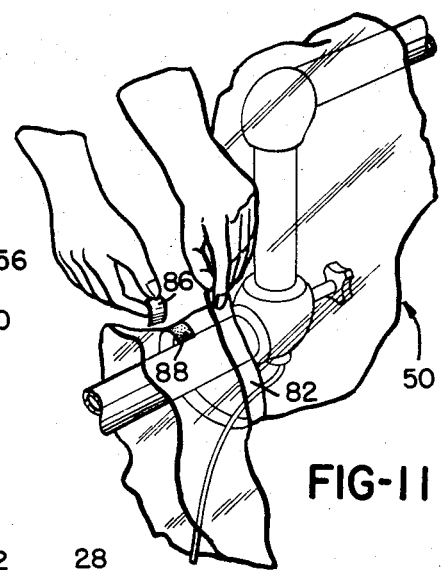

In the preferred embodiment of the invention a short length 84 of double faced adhesive is used to secure an end of each strip 82 to the outer surface of the drape. A portion of one adhesive surface of the adhesive member is adhered over end portion J of strip 84 with the rest of the adhesive surface engaging the drape at K. The outer surface of the adhesive is covered with a removable protective layer of paper, or the like, indicated by the numeral 86 which is adapted to be removed, see FIG. 11, for exposing adhesive surface 88 to which the inner surface of strip 82 may be adhered upon contact therewith, as hereinafter more fully explained.

With particular reference now to FIGS. 18 and 19, the numerals 90 denote generally a resilient element such as, by way of example, an O-ring or the like of a diameter less than the O.D. of an ocular 38, wherein said element is fixedly secured to the free outer end of a tubular member 56, such as by providing a loop 59 in the tubular member in which the element is housed incident to heat sealing at 55.

It should be understood that elements 90 yieldably constrict the outer ends of tubular members 56 whereby to securely though releasably engage the outer periphery of an ocular over which a tubular member has been pulled, as in FIG. 1.

Figure 24:
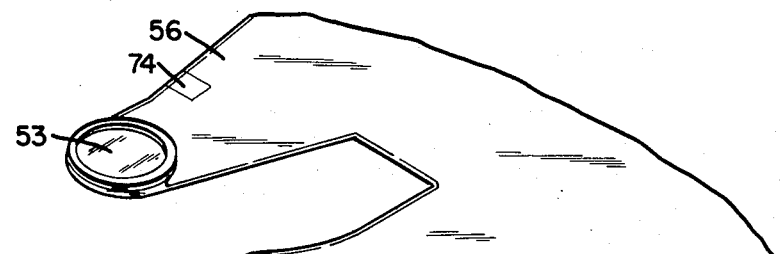
FIG. 24 is a perspective view of the cylindrical extensions of the subject drape which are provided with end closures in the form of transparent lenses.
Figure 25:
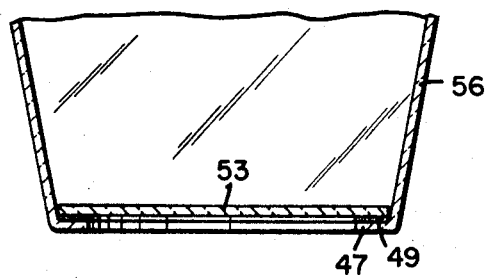
FIG. 25 is a sectional view taken on line 25—25 of FIG. 24.

In FIGS. 24 and 25 the outer ends of the tubular members 56 are closed by means of a transparent, optically clear lens 53 suitably secured thereto by means of an adhesive 49 interposed between adjacent portions of the lens and inturned flange-like end 47 of member 56.

Figure 23:
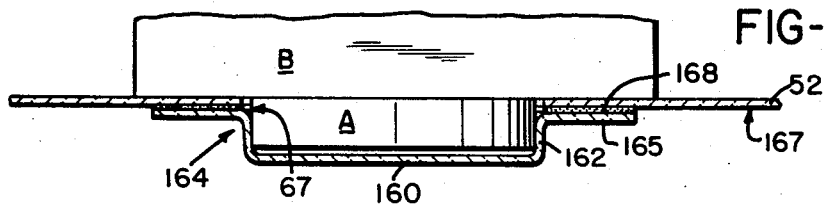
FIG. 23 is a plan view, partly in section, of a modification of a drape-lens illustrating its relationship with the projecting objective lens of an operation microscope.

FIG. 23 discloses modification of the lens housing 64, wherein the entire housing 164 is fabricated in a single piece from a suitable transparent, optically clear material formed to provide a flat lens portion 160, a cylindrical, objective lens ring-engaging portion 162 and an outturned flat drape engaging portion 165 which is secured to the outer surface 167 of drape 52 by means of adhesive 168. The inner diameter of portion 162 is dimensioned to securely through releasably frictionally engage the outer surface 67 of the objective lens ring A, as illustrated.

Figure 26:
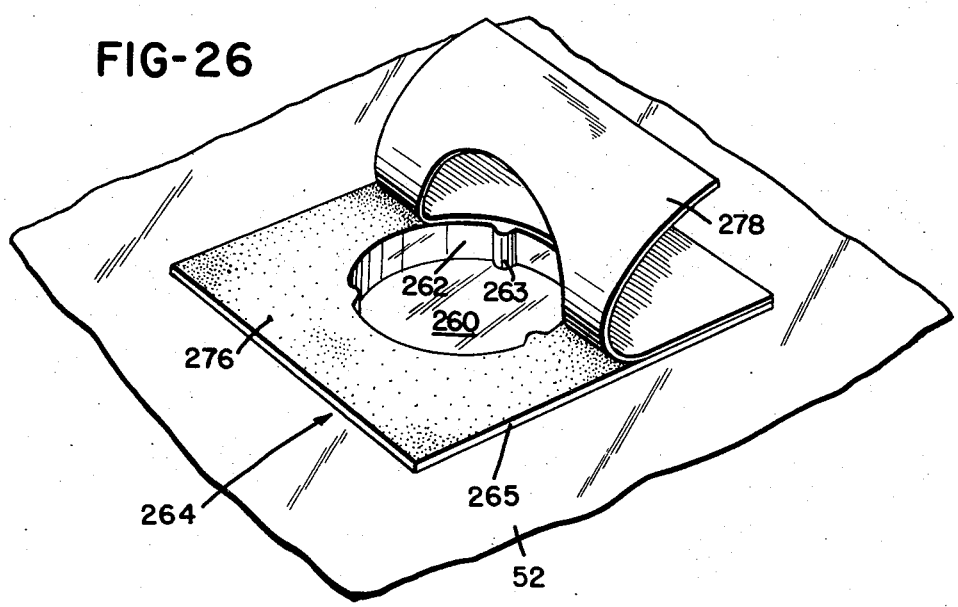
FIG. 26 is a perspective view of a modification of a drape lens of the present invention.
Figure 27:
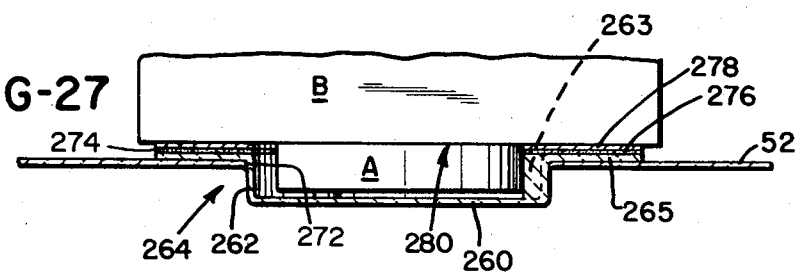
FIG. 27 is a view partly in section illustrating the relationship of the drape lens of FIG. 26 with the projecting operative lens of a microscope.
Figure 28:
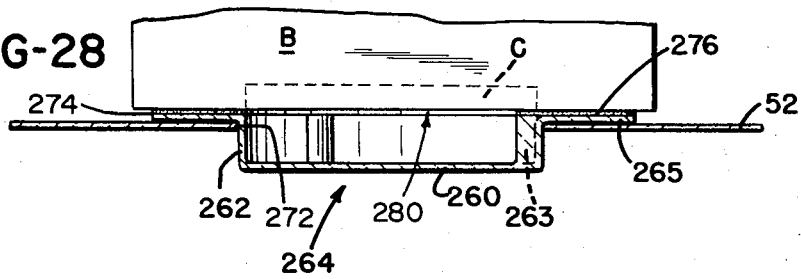
FIG. 28 is a view similar to FIG. 27 illustrating the relationship of the drape lens of FIG. 26 with the recessed operative lens of a microscope.

In FIGS. 26, 27 and 28 a further modification of lens housing 64 is illustrated, wherein the entire lens housing 264 is fabricated in a single piece from a suitable transparent, optically clear material formed to provide a flat lens portion 260, a substantially cylindrical, objective lens ring engaging portion 262 having a plurality of inwardly projecting abutments 263 which are dimensioned to yieldably engage the outer surface 67 of the outwardly projecting objective lens ring A, as illustrated in FIG. 27. An outturned, flat, drape-engaging portion 265 is secured to the inner face of the drape 52 by means of an adhesive, a heat seal, or the like for disposing the lens housing to the drape with portion 262 projecting downwardly from and outwardly through an opening 272 in the drape.

The lower surface of a double faced adhesive member 274 is adhered to the upper surface of portion 265. The upper adhesive surface 276 is normally covered with a removable paper backing 278 which when peeled off enables adhesive surface 276 to engage and adhere to the lower surface 280 of the microscope housing B. As a general rule when lens housing 264 is associated with the outwardly projecting objective lens ring A, as in FIG. 27 the upper, adhesive surface remains covered with the backing sheet 278, however, when a microscope has a recessed lens ring C, as in FIG. 28, the backing sheet is removed to enable the upper adhesive surface 276 to be adhered to lower surface 280 of the microscope housing B.

If desired, lenses 53 and 60 may be fabricated from glass, or any other suitable gas-impervious material such as, by way of example, double A grade 0.050 glass which is characterized by its optical clarity, resistance to scratching and ease of cleaning.

With particular reference now to FIG. 2, it will be noted that the subject drape as removed from its sterile envelope is folded into the compact package illustrated.

Figure 5:
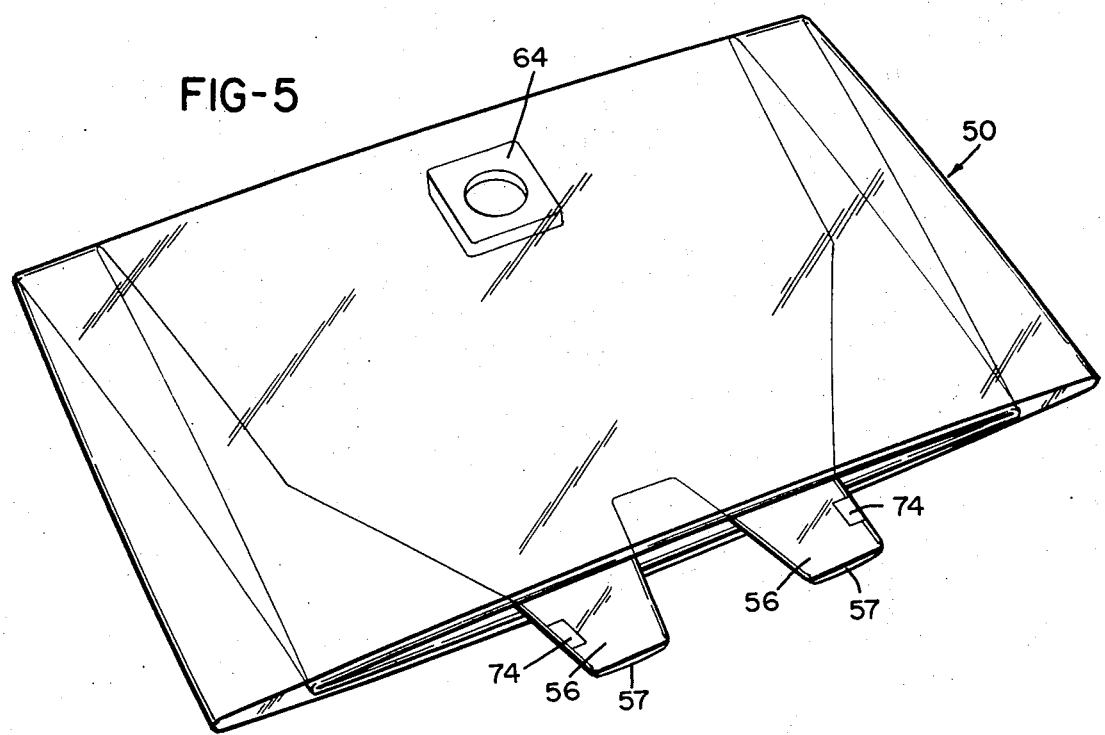
Figure 6:
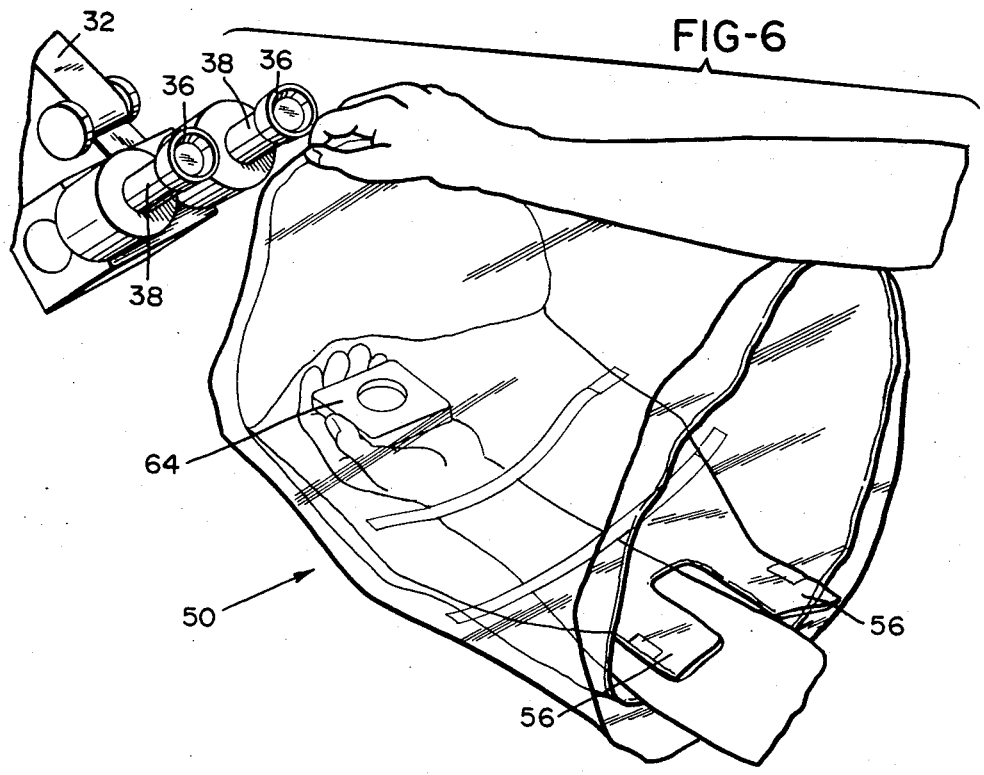
FIGS. 6, 7, 8, 9, 10, 11 and 12 are sequential plan views showing the manner in which the drape is associated with an operative microscope and its support arm.
Figure 7:
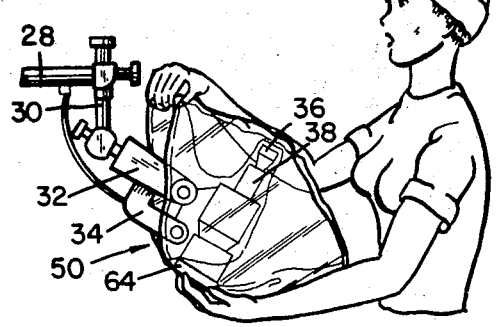
Figure 9:
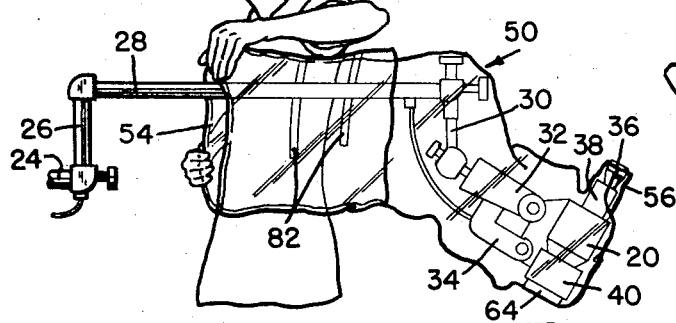

In order to house a microscope within the drape, it is unfolded as in FIGS. 3, 4 and 5 after which it may be initially introduced, as in FIG. 6, over the oculars and other portions of the microscope wherein one hand of an attendant will grasp the outer or lower surface of the drape at the lens housing for fitting said housing onto the projecting portion A of the microscope lens ring, as in FIG. 7, whereby the lens housing will be securely, through releaseably, anchored relative to the objective lens of the microscope. Thereafter, or before the lens housing is secured to the objective lens ring of the microscope, tubular portions 56 of the drape are pulled downwardly over the eyepieces 36 and thence over oculars 38. The tubular portions 56 may then be secured to the oculars, after which the free open end 54 of the drape may be grasped, as in FIGS. 9 and 10, for unfolding and extending the drape over the oversupport arms 28, 26 and 24. The drape is then preferably secured relative to arm portions 24 and 28 of the supporting structure by means of fastening members 82, or the like, whereby the drape will be secured to the microscope and its supporting members as illustrated in FIG. 1, with the open end of the drape terminating at or closely adjacent to support member 22.

From the foregoing it will be noted that the drape of the subject invention completely houses all portions of the microscope and its supporting means in such a manner as to positively preclude the escape of germs, dust, hot air or other undesirable, infection-promoting media in the operating zone. The lens housing of the drape positively encloses the entire lower portion of the microscope, and those tubular portions of the drape which are tightly secured to oculars 38 effectively preclude passage of heated air, bacteria and the like into the operating zone via the oculars. Of course, when the tubular members of the drape are provided with lenses 53, as in FIG. 24, the eyepiece 36 and oculars 38 are also completely housed within the drape, thereby providing a condition of maximum aseptic conditions.

After a drape has served its purpose, it may be quickly removed from the microscope and its mounting means by severing members 82 and then pulling the drape over the microscope, after which the drape is discarded.

What is claimed is:

1. A disposable microscope drape for positioning over an operating microscope in enclosing sealing relationship thereto to prevent exhaust of air from within the drape into an operating room at a location adjacent to an operating zone, said drape fabricated from thin, flexible, air impervious material and comprising an elongate, continuous substantially tubular drape open at one end and terminating at the other end in at least one elongate, outwardly projecting cylinder-defining extension for receiving the ocular of the microscope, means on said extension for sealing the extension relative to the occular against the escape of air through said extension, said drape having means for exhausting air from therewithin at a location remote from the operating zone, a lens ring housing secured and sealed to and carried by said tubular drape at a location remote from its open end, said lens ring housing including an optically clear, distortion free, thin, transparent, flat lens to overlie an objective lens of said microscope in spaced, parallel, enclosing relationship thereto, thereby sealing the microscope in the operating zone to prevent exhaust of air and spread of germs from the microscope into the operating zone.

2. A disposable microscope drape as called for in claim 1, wherein the material from which it is fabricated constitutes co-polymer sheeting one mil thick capable of withstanding temperatures up to 350°F.

3. A disposable microscope drape as called for in claim 1, wherein the lens ring housing includes means for securely though releasably engaging a portion of a microscope adjacent the objective lens thereof for positioning the lens of the drape in spaced, parallel, enclosing relationship with the objective lens of the microscope.

4. A disposable microscope drape as called for in claim 1, wherein the lens ring housing includes a peripheral shoulder which projects upwardly from its lens whereby to securely though releasably engage portions of the outer surface of the projecting objective lens ring of a microscope for positioning the lens of the drape in spaced, parallel, enclosing relationship with the objective lens of the microscope.

5. A disposable microscope drape as called for in claim 1, wherein the lens ring housing includes an upper, axial surface having pressure sensitive adhesive thereon for adherence to a portion of the housing of a microscope adjacent the objective lens thereof for securely though releasably positioning the lens of the drape in spaced, parallel, enclosing relationship with the objective lens of the microscope.

6. A disposable microscope drape as called for in claim 1, wherein the lens ring housing includes a peripheral shoulder portion which projects upwardly from its lens and which includes an upper, axial surface extending from the upper end of said shoulder portion, said axial surface having pressure sensitive adhesive thereon and removable masking means covering said adhesive, whereby the said lens ring housing is adapted to be secured either to portions of the outer surface of the projecting objective lens ring of a microscope introduced into the shoulder portion of the lens ring housing, or to a portion of the housing of a microscope adjacent the objective lens thereof adhered to the pressure sensitive surface of the lens ring housing for securely though releasably positioning the lens of the drape in spaced, parallel, enclosing relationship with the objective lens of the microscope.

7. A disposable microscope drape as called for in claim 1, wherein the lens ring housing is secured to and carried by the inner surface of the tubular member.

8. A disposable microscope drape as called for in claim 1, wherein the cylinder-defining extensions are open ended and dimensioned to loosely engage the projecting oculars of a microscope with the eyepieces of said oculars extending beyond the outer open ends of said extensions, and means secured to and carried by each such extension for constricting each extension on an ocular for precluding the escape of air from the inside of the drape via said extensions.

9. A disposable microscope drape as called for in claim 8, wherein the length of the tubular member is sufficient to house the entire head of an operating microscope including the support arms by which it is adjustably mounted relative to a vertical standard, with the open end of the tubular member adjacent said standard, whereby air from inside the drape is exhausted only through its open end at a location remote from the microscope head of the microscope.

10. A disposable microscope drape as called for in claim 8, wherein the means for constricting said cylinder-defining extensions onto the oculars of a microscope comprises: a length of double faced adhesive, one face of which is adhered directly to the outer surface of an extension, the other face of which is covered with a removable protective strip which when removed presents an adhesive surface to which other portions of the extension are adhered for effecting and maintaining an air tight seal between an ocular of the microscope and its corresponding extension of the drape.

11. A disposable microscope drape as called for in claim 8, wherein the means for constricting said cylinder-defining extensions onto the oculars of a microscope comprises: a ring shaped, resilient member secured to and carried by the outer open end of each cylinder-defining extension, wherein the normal diameter of said resilient members are less than the outer diameter of the oculars to provide an air tight seal between the oculars and their respective drape extensions.

12. A disposable drape as called for in claim 1, wherein the lens ring housing constitutes expanded cross-linked polyethylene foam.

13. A disposable microscope drape as called for in claim 1, wherein the lens ring housing and the optically clear, distortion free, transparent lens are integrally formed from the lens material.

14. A disposable microscope drape as called for in claim 1, wherein an optically clear, distortion free, transparent lens is secured to and carried by the outer end of each of the cylinder-defining extensions.

15. A disposable microscope drape as called for in claim 14, wherein the lenses in the ends of the said cylinder-defining extensions are dimensioned to be received over and in enclosing relationship with the eyepieces of the oculars of a microscope.

16. A disposable microscope drape as called for in claim 14, wherein the cylinder-defining extensions include means integral therewith for securing the extensions to the oculars of a microscope for positioning and maintaining the lenses in the ends of the extensions in contacting enclosing relationship with the eyepieces of the oculars.

17. A disposable microscope drape as called for in claim 1, wherein the length of the tubular member is sufficient to house the entire head of an operating microscope and the support arms by which the microscope is adjustably mounted relative to a vertical standard, with the open end of the tubular member adjacent said standard.

18. A disposable microscope drape as called for in claim 17, wherein the tubular member includes one or more elongate, flexible tie members intermediate its length.

19. A disposable microscope drape as called for in claim 18, wherein the tie members are integral with the tubular member and located between the said lens ring housing and the open end of the drape.

20. A disposable microscope drape as called for in claim 19, wherein the tie members are of such a length as to encircle the tubular member when gathered loosely about the microscope support arms.

21. A disposable microscope drape as called for in claim 20, wherein the tie members comprise an elongate, flexible member one end of which is adhesively secured to the outer surface of said tubular member by means of a double faced adhesive one face of which is permanently adhered to the outer surface of the tubular member and to the outer end surface of the tie member, and wherein the outer face of the adhesive is covered with a removable protective strip which when removed presents a pressure sensitive adhesive surface to which the terminal portions of the tie member are adhered for maintaining the tubular member in gathered condition about the microscope support arms.

* * * * *